US009441531B2

(12) United States Patent
Roozenboom et al.

(10) Patent No.: US 9,441,531 B2
(45) Date of Patent: Sep. 13, 2016

(54) DIVERTER VALVE FOR CHARGE AIR SYSTEM

(71) Applicant: Caterpillar Inc., Peoria, IL (US)

(72) Inventors: Stephan D. Roozenboom, Washington, IL (US); Craig P. Hittle, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 297 days.

(21) Appl. No.: 14/146,308

(22) Filed: Jan. 2, 2014

(65) Prior Publication Data

US 2015/0184580 A1    Jul. 2, 2015

(51) Int. Cl.

| F02B 33/44 | (2006.01) |
|---|---|
| F16K 11/078 | (2006.01) |
| F16K 11/087 | (2006.01) |
| F16K 11/052 | (2006.01) |
| B60H 1/00 | (2006.01) |
| F02B 29/04 | (2006.01) |
| F16K 11/074 | (2006.01) |
| F02B 37/00 | (2006.01) |
| F02B 37/007 | (2006.01) |
| F16K 1/22 | (2006.01) |
| F16K 1/226 | (2006.01) |

(52) U.S. Cl.
CPC ....... *F02B 29/0412* (2013.01); *F02B 29/0418* (2013.01); *F02B 33/44* (2013.01); *F16K 11/0525* (2013.01); *F16K 11/074* (2013.01); *F02B 29/0425* (2013.01); *F02B 37/001* (2013.01); *F02B 37/007* (2013.01); *F16K 1/224* (2013.01); *F16K 1/2261* (2013.01); *Y02T 10/146* (2013.01); *Y10T 137/86501* (2015.04)

(58) Field of Classification Search
CPC  F02B 29/0412; F02B 29/0418; F02B 33/44; F02B 29/412; F16K 11/0525; F16K 11/074; F16K 1/2261; Y10T 137/86501
USPC .............. 123/562, 41.01, 568.29; 137/15.21, 137/625.4, 625.41, 625.44, 602, 599.03, 137/898
See application file for complete search history.

(56) References Cited

U.S. PATENT DOCUMENTS

| 3,521,659 | A | * | 7/1970 | Seger ............... F16K 15/033 137/112 |
|---|---|---|---|---|
| 5,136,988 | A | | 8/1992 | Frohberg et al. |
| 5,377,718 | A | * | 1/1995 | Sand ............... F16K 11/0743 137/625.11 |
| 6,484,703 | B1 | | 11/2002 | Bailey |
| 6,644,934 | B2 | | 11/2003 | Goettel et al. |
| 7,163,005 | B2 | | 1/2007 | Tussing et al. |
| 8,171,731 | B2 | | 5/2012 | Joergl et al. |

(Continued)

FOREIGN PATENT DOCUMENTS

| DE | 2205618 | 8/1973 |
|---|---|---|
| DE | 3226438 | 1/1984 |

(Continued)

*Primary Examiner* — Jesse Bogue
*Assistant Examiner* — Deming Wan

(57) ABSTRACT

A diverter valve is disclosed for use with a charge air system. The diverter valve may have a plurality of first inlets configured to receive a flow of warmed air, a plurality of second inlets configured to receive a flow of cooled air, and a single outlet. The diverter valve may also have a single valve element movable to any position between a first position at which the plurality of first inlets are fluidly connected to the single outlet and the plurality of second inlets are blocked from the single outlet, and a second position at which the plurality of second inlets are fluidly connected to the single outlet and the plurality of first inlets are blocked from the single outlet.

19 Claims, 4 Drawing Sheets

(56) References Cited

U.S. PATENT DOCUMENTS

| | | |
|---|---|---|
| 8,171,895 B2 | 5/2012 | Scolton et al. |
| 8,316,805 B2 | 11/2012 | Kardos et al. |
| 8,375,926 B2 | 2/2013 | Sheidler et al. |
| 2010/0180590 A1 | 7/2010 | Andreae et al. |
| 2013/0000297 A1 | 1/2013 | Moravec et al. |
| 2013/0014733 A1 | 1/2013 | Kolb |

FOREIGN PATENT DOCUMENTS

| | | |
|---|---|---|
| EP | 1643110 | 4/2006 |
| EP | 1 923 551 | 5/2008 |
| JP | S599376 | 1/1984 |
| WO | 2010091891 | 8/2010 |
| WO | WO 2012/108796 | 8/2012 |

\* cited by examiner

DIVERTER VALVE FOR CHARGE AIR SYSTEM

TECHNICAL FIELD

The present disclosure relates generally to a diverter valve and, more particularly, to a diverter valve for a charge air system.

BACKGROUND

An engine combusts a mixture of fuel and air to generate a mechanical, hydraulic, and/or electrical power output, along with a flow of hot exhaust gases. A turbocharged engine includes one or more turbochargers that are driven by the exhaust gases to compress combustion air entering the engine. By forcing compressed air into the engine, more air becomes available for combustion than could otherwise be drawn into the engine by motion of the engine's pistons. This increased supply of air allows for a corresponding increase in fueling, resulting in increased power output. A turbocharged engine typically produces more power than the same engine without turbocharging.

The air compressed by the turbocharger is also heated by the compressing process. This heat can reduce a density of the air, resulting in less air being forced into the engine during each stroke of the engine's pistons. Accordingly, some turbocharged engines include one or more aftercoolers that cool the charge air before it enters the engine. Cooling the charge air increases its density and the amount of air that enters the engine during each piston stroke.

In some situations, it may be possible for the aftercoolers to overcool the charge air entering the engine. Specifically, at engine startup or during operation at cold ambient conditions, the air may be cooled to a level that no longer supports desired operation. For example, the air could be cooled to a temperature level below which emissions control devices of the engine no longer operate or operate inefficiently. In these situations, it may be desirable to divert the charge air around the aftercooler and directly into the engine.

Historically, a turbocharged engine having an aftercooler was provided with a series of butterfly control valves and/or thermostats that helped to regulate a temperature of the charge air. These multiple butterfly valves and/or thermostats, however, increase a cost and complexity of the associated charge air system, while also reducing a durability of the system.

Another type of valve is disclosed in U.S. Patent 6,484,703 of Bailey that issued on Nov. 26, 2002 ("the '703 patent"). Specifically, the '703 patent discloses a diverter valve having two inlets, two outlets, and a butterfly plate mounted on a pivot shaft. The butterfly plate is movable to any position between a first position and a second position. When the butterfly plate is in the first position, fluid flows from a first of the inlets to a first of the outlets and from a second of the inlets to a second of the outlets. When the butterfly plate is in the second position, fluid flows from the first inlet to the second outlet and from the second inlet to the first outlet. When the butterfly plate is between the first and second positions, fluid from the first and second inlets mix and flow to both of the first and second outlets. The butterfly plate is moved between the different positions by way of an electrical solenoid, based on sensed information regarding the different fluid flows.

Although the valve of the '703 patent may be adequate in some situations, it may lack applicability to charge air systems. In particular, the valve of the '703 patent may not be able to regulate fluid flows between multiple inlets and a single outlet, in addition, the valve may be difficult and/or expensive to fabricate, and require significant torque from the electrical solenoid to move between the different positions when under pressure.

The diverter valve of the present disclosure solves one or more of the problems set forth above and/or other problems in the art.

SUMMARY

In one aspect, the present disclosure is directed to a charge air diverter valve. The charge air diverter valve may include a plurality of first inlets configured to receive a flow of warmed air, a plurality of second inlets configured to receive a flow of cooled air, and a single outlet. The charge air diverter valve may also include a single valve element movable to any position between a first position at which the plurality of first inlets are fluidly connected to the single outlet and the plurality of second inlets are blocked from the single outlet, and a second position at which the plurality of second inlets are fluidly connected to the single outlet and the plurality of first inlets are blocked from the single outlet.

In another aspect, the present disclosure is directed to another charge air diverter valve. This charge air diverter valve may include a housing have a first portion with a first inlet, and a second portion with a second inlet and an outlet. The second portion may be configured to engage the first portion. The charge air diverter valve may also include a valve element disposed within the first portion of the housing. The valve element may be movable between a first position at which the first inlet is fluidly connected to the outlet and the second inlet is blocked from the outlet by the valve element, and a second position at which the second inlet is fluidly connected to the outlet and the first inlet is blocked from the outlet by the valve element. The charge air diverter valve may further include an actuator mounted to the first portion of the housing and configured to move the valve element between the first and second positions.

In yet another aspect, the present disclosure is directed to a charge air system for an engine having a plurality of cylinders. The charge air system may include an intake manifold configured to direct charge air into the plurality of cylinders, a first compressor associated with a first subset of the plurality of cylinders, and a second compressor associated with a second subset of the plurality of cylinders. The charge air system may further include a first aftercooler, a second aftercooler, and a diverter valve configured to interconnect the intake manifold, the first compressor, the second compressor, the first aftercooler, and the second aftercooler. The diverter valve may include a two-piece housing having a first inlet associated with the first compressor, a second inlet associated with the second compressor, a third inlet associated with the first aftercooler, a fourth inlet associated with the second aftercooler, and an outlet associated with the intake manifold. The diverter valve may also include a single valve element disposed within the two-piece housing. The single valve element may be movable from a first position at which the first and second inlets are fluidly connected to the outlet and the third and fourth inlets are blocked by the single valve element, and a second position at which the third and fourth inlets are fluidly connected to the outlet and the first and second inlets are blocked by the valve element. The diverter valve may also include an actuator mounted to the two-piece housing and configured to selectively move the valve element between the first and second positions.

BRIEF DESCRIPTION OF THE DRAWINGS

FIGS. 1-5 are cutaway view illustrations of the diverter valve of FIG. 2; and

DETAILED DESCRIPTION

Figure 1:
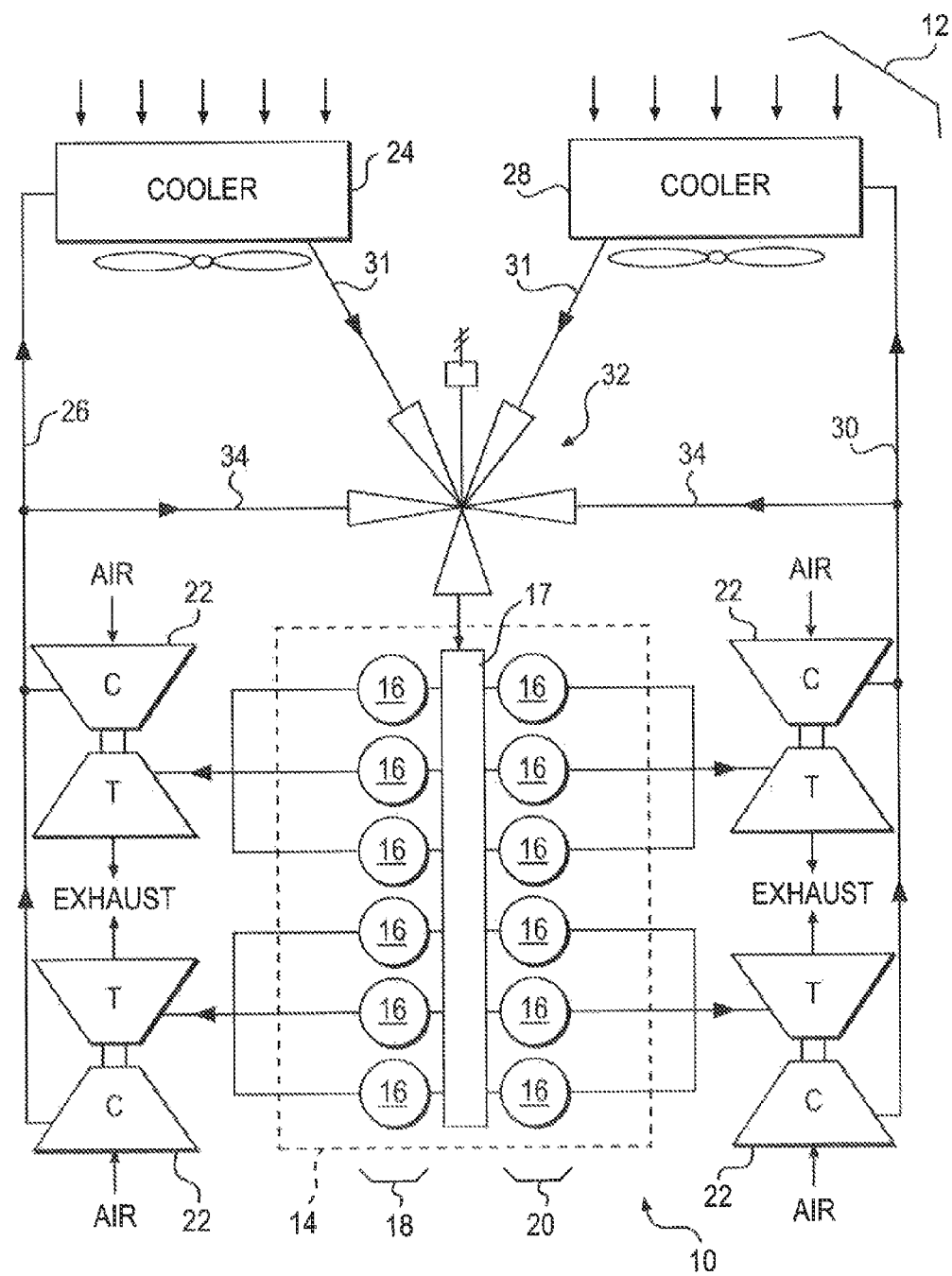
FIG. 1 is a diagrammatic illustration of an engine having an exemplary disclosed charge air system.

FIG. 1 illustrates an engine 10 having a charge air system 12. For the purposes of this disclosure, engine 10 is depicted and described as a four-stroke diesel engine. One skilled in the art will recognize, however, that engine 10 may be any other type of combustion engine such as, for example, a two or four-stroke gasoline or gaseous fuel-powered engine. Charge air system 12 may be configured to direct air or a mixture of air and fuel into engine 10 for combustion.

Engine 10 may include an engine block 14 that at least partially defines a plurality of cylinders 16. A piston (not shown) may be slidably disposed within each cylinder 16 to reciprocate between a top-dead-center position and a bottom-dead-center position, and a cylinder head (not shown) may be associated with each cylinder 16. Each cylinder 16, piston, and cylinder head may together at least partially define a combustion chamber. In the illustrated embodiment, engine 10 includes twelve cylinders 16 arranged in a V-configuration (i.e., a configuration having first and second banks 18, 20 or rows of cylinders 16). However, it is contemplated that engine 10 may include a greater or lesser number of cylinders 16 and that cylinders 16 may be arranged in an inline configuration, in an opposing-piston configuration, or in another configuration, if desired.

Charge air system 12 may include, among other things, at least one compressor and at least one cooler located to chill air pressurized by the compressor before it enters the combustion chambers of engine 10 via an intake manifold 17. Each compressor may embody a fixed-geometry compressor, a variable-geometry compressor, or any other type of compressor configured to receive air and compress the air to a desired pressure level. In the disclosed exemplary embodiment, charge air system 12 has four compressors 22, each associated with different subsets of cylinders 16 (e.g., each driven by a corresponding turbine 23 that receives exhaust from a dedicated grouping of three cylinders 16). It is contemplated that a different number of compressors 22 may he included and/or that compressors 22 could be configured ire a different way (e.g., turbines 23 could be connected to common exhaust manifolds associated with any number of cylinders 16), if desired. Compressors 22 may be driven by turbines 23 to separately draw air through a corresponding filter (not shown), compress the air to a desired pressure level, and direct the pressurized air to any number of different air coolers. For example, compressors 22 associated with cylinders 16 of first bank 18 may together direct a combined flow of compressed air to a first air cooler 24 via a passage 26, while compressors 22 associated with cylinders 16 of second bank 20 may together direct a combined flow of compressed air to a second air cooler 28 via a passage 30. It is contemplated, however, that all compressors 22 could alternatively direct compressed air together to a single and common air cooler or to more than two air coolers, if desired.

After dissipating heat within air coolers 24, 28, the air pressurized by compressors 22 may be selectively directed through a passage 31 and a diverter valve 32 into intake manifold 17. A bypass passage 34 may be associated with each air cooler 24, 28 and allow compressed air to selectively flow into intake manifold 17 without being cooled (i.e., without first being directed through air coolers 24, 28). It is contemplated that the cooled and/or warmed air from compressors 22 could alternatively be directed into multiple different intake manifolds associated with any configuration of cylinders 16. It should be noted that the terms "cooled air" and "warmed air" are relative terms not meant to represent or be limited to specific temperatures.

In the disclosed embodiment, each cooler 24, 28 is an air-to-air aftercooler (ATAAC). In particular, as the pressurized air from compressors 22 flows through channels of each cooler 24, ambient air may be forced through adjacent channels. In this configuration, the ambient air, being cooler than the air pressurized by compressors 22, absorbs heat from the pressurized air via conduction through metallic walls of the channels. It is contemplated, however, that one or both of coolers 24, 28 could be a different type of air cooler, if desired. For example, coolers 24, 28 could be liquid-to-air coolers, wherein a liquid coolant (e.g., water, glycol, or a blended mixture) is directed through channels of coolers 24, 28 to absorb heat from the pressurized air.

Figure 2:
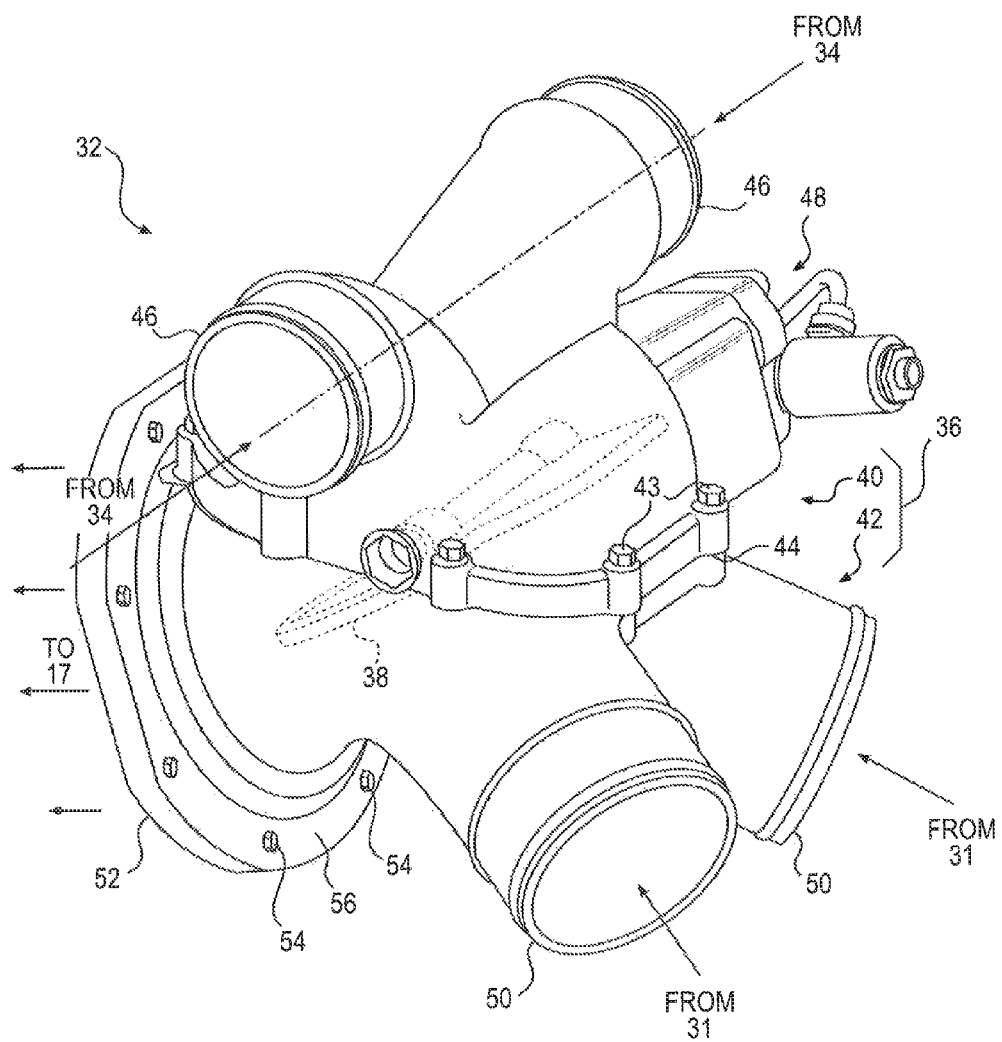
FIG. 2 is an isometric view illustration of an exemplary disclosed diverter valve that may be used in conjunction with the charge air system of FIG. 1.

An exemplary physical embodiment of diverter valve 32 is shown in FIG. 2. As can be seen in this figure, diverter valve 32 includes a two-piece housing 36 configured to receive a single valve element 38. In particular, housing 36 may include a first portion 40, and a second portion 42 that is configured to engage first portion 40 along a parting line 44. A seal 45, for example an o-ring seal. (see FIGS. 3-6) or gasket, may be disposed at an interface between first and second portions 40, 42, and first and second portions 40, 42 may be connected to each other via a plurality of threaded fasteners 43. Both of first and second portions 40, 42 may be cast from aluminum, although other materials and/or fabrications method could alternatively be utilized.

First portion 40 of housing 36 may include first and second inlets 46, each configured to receive a flow of Warned air (i.e., air not having first passed through coolers 24, 28) from a separate one of bypass passages 34 (referring to FIG. 1). In the disclosed embodiment, inlets 46 may be generally axially aligned with each other and oriented generally perpendicular relative to a flow of air through intake manifold 17. And although inlets 46 are shown at an upper location (relative to gravity) of housing 36, it is contemplated that diverter valve 32 could be installed in another orientation, if desired. As will be described in more detail below, valve element 38 may be pivotally mounted within first portion 40, and an actuator 48 may be mounted to first portion 40 and operatively connected to drive movements of valve element 38.

Second portion 42 of housing 36 may include first and second inlets 50 and a single outlet 52. Each of inlets 50 may be configured to receive a flow of chilled air from a separate one of passages 31 that extend to air coolers 24, 26 (referring to FIG. 1), while outlet 52 may be configured to discharge air to intake manifold 17. In the disclosed embodiment, inlets 50 are symmetrically oriented at an oblique angle relative to a primary flow direction through outlet 52, such that second portion 42 has a general Y-shape (i.e., with inlets 50 forming the arms of the Y, and outlet 52 forming the stem of the Y). Housing 36, at outlet 52, may be connected to intake manifold 17 by way of a plurality of fasteners 54 located around a periphery of a mounting flange 56.

Figure 3:
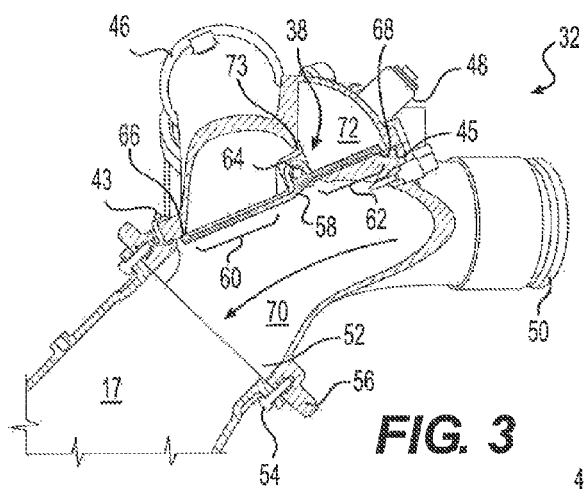
Figure 4:
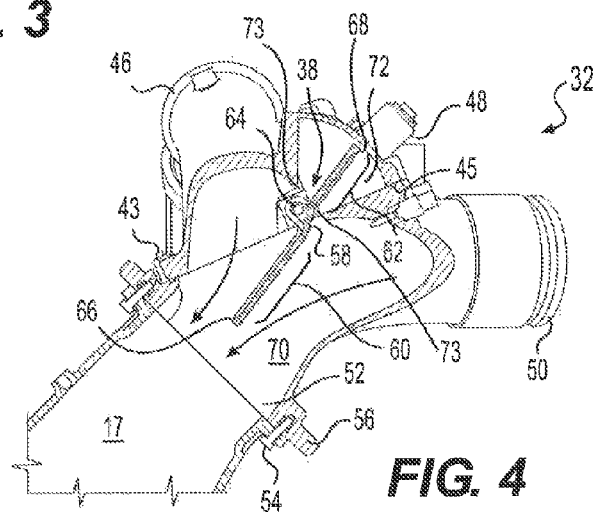
Figure 5:
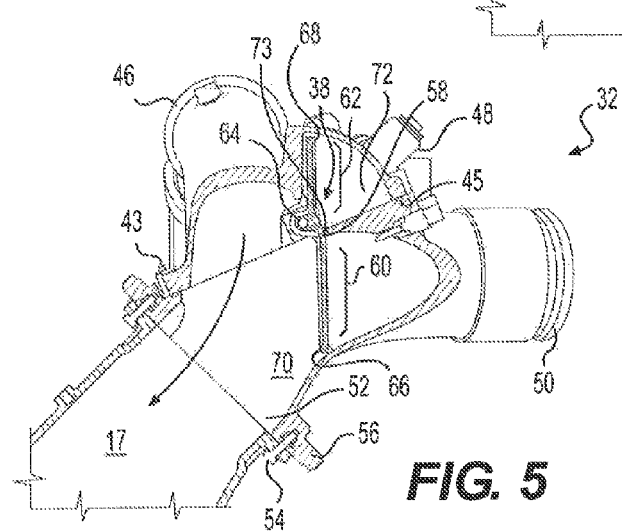

As shown in FIGS. 3-5, valve element 38 may include a plate 58 having a valve portion 60, a balancing portion 62, and shaft 64 formed in plate 58 at a location between valve and balancing portions 60, 62. Plate 58 may be fabricated from a material different from housing 36, for example from iron through a casting process. As will be explained in more detail below, protruding ends of shaft 64 may pass through bores in housing 36 (i.e., in opposing side walls of first portion 40), such that plate 58 may pivot about shaft 64. An effective pressure area of valve portion 60 may be larger than an effective pressure area of balancing portion 62, such that plate 58 may be semi-balanced about shaft 64 when exposed to pressurized air flows. In one example, a ratio of the pressure areas may be about 65:35. By at least partially balancing plate 58, an amount of torque required by actuator 48 to rotate valve element 38 may be reduced.

A first lip seal 66 may be associated with valve portion 60 and formed around a periphery of plate 58 at one side thereof (i.e., at a side facing inlets 46). A second lip seal 68 may be associated with balancing portion 62 and formed at an opposing side of plate 58 (i.e., around a periphery of plate 58 at a side facing inlets 50 and outlet 52). First lip seal 66 may be configured to selectively engage a machined surface of first housing portion 40, while second lip seal 68 may be configured to selectively engage a machined surface of second housing portion 42.

Valve element 38 may be configured to rotate through an angle of about 75-90°, from a first position (shown in FIG. 3) through an intermediate position (shown in FIG. 4) to a second position (shown in FIG. 5), to selectively direct flows of pressurized air from only inlets 46, from only inlets 50, or from all inlets 46, 50 through outlet 52. In particular, when in the first position, valve element 38 may move to allow cooled air to flow substantially unrestricted from inlets 46 to outlet 52, while at the same time blocking warmed air flow from inlets 46. And when valve element 38 is in the second position, warmed air from inlets 50 may be allowed to pass through outlet 52, while chilled air flow from inlets 46 may be blocked by valve element 38. Valve element 38 may also move to the intermediate position between the first and second positions, at which a mixture of warmed and cooled air from all inlets 46, 50 may pass through outlet 52. When valve element 38 is in the first position, first and second lip seals 66, 68 may engage housing 36 to substantially seal off inlets 46 from inlets 50. First and second lip seals 66, 68 may only engage housing 36 when valve element 38 is in the first position.

Balance portion 62 of plate 58 may be in fluid communication with pressurized air during all stages and/or modes of engine operation, regardless of the position of valve element 38. In particular, during movement of valve element 38 between the first and second positions, valve portion 60 of plate 58 may pivot through an open cavity 70 located between inlets 46 and inlets 50 and formed by both of first and second housing portions 40, 42. At this same time, balance portion 62 may likewise pivot through about the same angle within a separate cavity 72 formed primarily by first housing portion 40, and cavity 72 may communicate with cavity 70 via one or more flow paths 73 (depending on the position of valve element 38). Portions of cavity 72 may be open to inlets 46, 50 and cavity 70 during movements of valve element 38, such that both sides of balancing portion 62 are continuously exposed to pressurized air in the same manner that both sides of valve portion 60 are continuously exposed to the pressurized air. This exposure should generate a reactive torque on valve element 38 that somewhat (but not fully) counteracts a primary torque on valve element 38 caused by valve portion 60 being exposed to similar pressurized air flows. The imbalance of torque generated by the difference in pressure areas of valve portion 60 and balancing portion 62 may be accommodated by an input force from actuator 48. It is contemplated that valve element 38 could he fully balanced, if desired, although such a configuration may require additional volume within housing 36 (i.e., within cavity 72 inside first housing portion 40) and additional space on engine 10 for an enlarged balancing portion.

Figure 6:
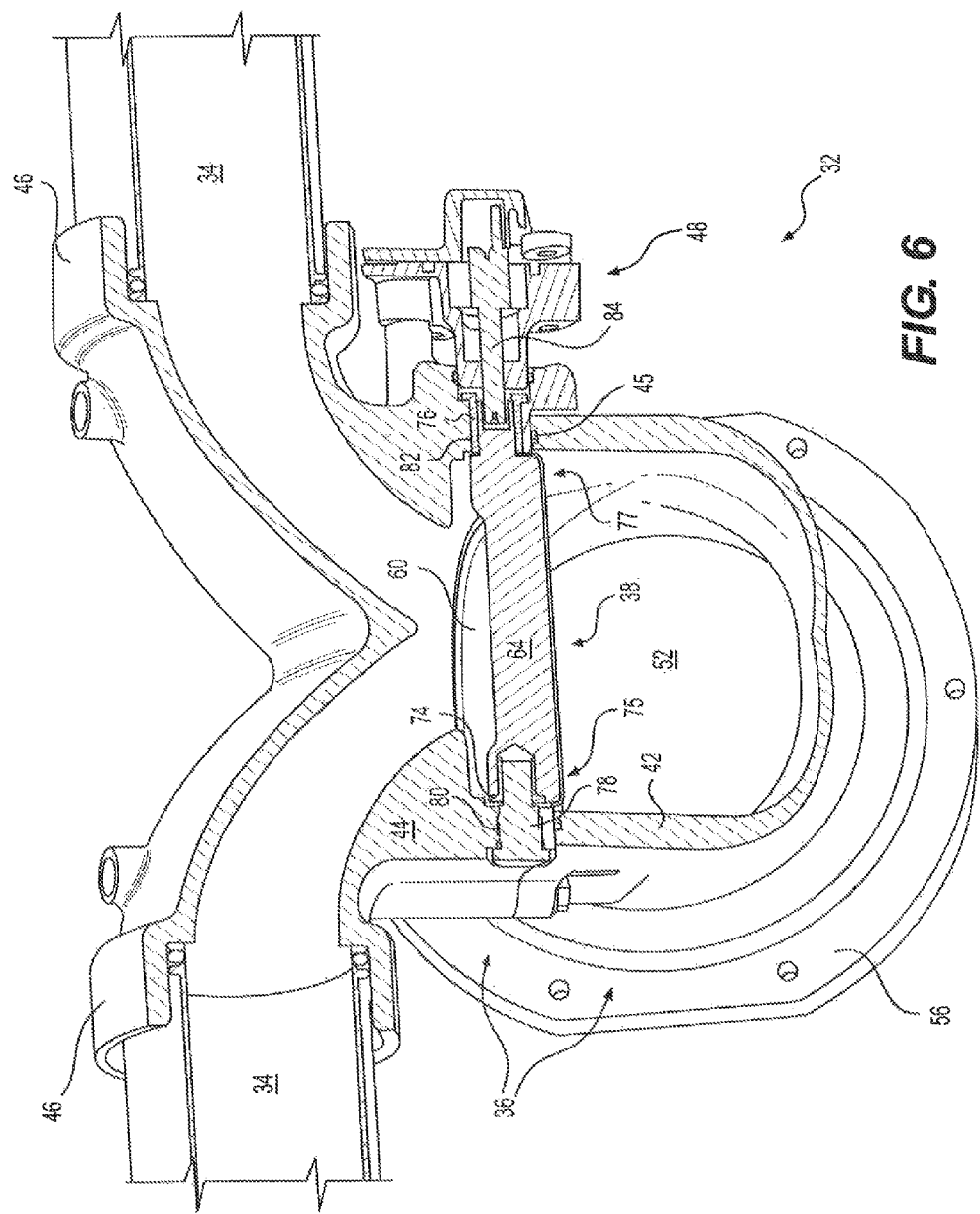
FIG. 6 is a cross-sectional view illustration of the diverter valve of FIG. 2.

FIG. 6 illustrates the connection of valve element 38 with housing 36. As can be seen in this figure, valve element 38 may be rotatably mounted relative to housing 36 by way of a first bushing 74 located at a first end 75 of shaft 64 and a second bushing 76 located at a second end 77 of shaft 64. First bushing 74 may be slipped into a corresponding opening in the first end 75 of shaft 64 and configured to receive a stem or shank of a fastener 78. Fastener 78 may be inserted through a housing bore 80 into first bushing 74 from outside of housing 36, such that a head of fastener 78 engages an external surface of housing 36. Second bushing 76 may be slipped over the opposing second end 77 of shaft 64 and configured to be received within a corresponding housing bore 82. Second bushing 76 may be slipped over the second end of shaft 64 from outside of housing 36, such that a lip of bushing 76 engages the external surface of housing 36. A rod portion 84 of actuator 48 may engage the second end of shaft 64, through second bushing 76, to selectively transfer opposing torques that cause rotation of valve element 38 between the first and second positions. In the disclosed embodiment, both bushings 74, 76 are turned from a bronze material, although other fabrication methods and/or materials could alternatively be utilized. The connection of valve element 38 to housing 36 has been designed in such a way (e.g., in a way the requires insertion of fasteners and bushings from outside of housing 36) so as to limit the possible inhaling of valve components (bushings, fasteners, etc.) by engine 10 during a mechanical failure event.

In the disclosed exemplary embodiment, actuator 48 is mechanically fastened to housing 36, hydraulically powered, and electrically actuated. In particular, actuator 48 may be mounted to the external surface of first housing portion 40, and selectively provided with a supply of pressurized oil (for example from a pump that is driven by engine 10—not shown). And when electronically triggered to do so (e.g., by a controller based on a measured and/or desired intake or exhaust temperature), the pressurized oil may be selectively directed to a particular pressure chamber(s) within actuator 48 that causes rod portion 84 to rotate in a desired direction (i.e., to either increase or decrease a temperature of air entering intake manifold 17). During an electrical failure (as long as pressurized oil is still being directed to or remains within actuator 48), actuator 48 may move to a default position at which valve element 38 is forced to or maintained in the first position (i.e., in the position at Which cooled air from coolers 24, 28 is directed into engine 10). This default position may help to protect engine 10 from any possible overheating events that could occur during the electrical failure. However, during a hydraulic failure (i.e., upon loss of pressure at actuator 48), valve element 38 may be allowed to move to the intermediate position described above. It is contemplated that actuator 48 could alternatively be mechanically powered, electrically powered, pneumatically powered, or powered in another way, if desired. Similarly, it is contemplated that operation of actuator 48 could triggered in a manner different than described above.

INDUSTRIAL APPLICABILITY

The disclosed diverter valve may be used in any fluid handling system requiring diversion control over multiple flows of fluid passing through a single outlet. The disclosed diverter valve finds particular applicability in charge air systems where cool air competes with warmer bypass air for passage into an engine's intake manifold. The disclosed diverter valve may be electronically controlled to selectively divert air of a desired temperature into the intake manifold depending on current conditions and system functionality/efficiency requirements. Assembly of the disclosed diverter valve will now be described with reference to FIG. 6.

Valve element 38 must first be assembled into first portion 40 of housing 36, before first portion 40 can be connected to second portion 42. To assemble valve element 38, first bushing 74 may be inserted into the opening at first end 75 of shaft 64, and then second end 77 of shaft 64 may be inserted through bore 82 from inside of first housing portion 40. Second end 75 of shaft 64 (now containing first bushing 74) may then be placed adjacent bore 80 inside first portion 40 of housing 36, and fastener 78 may be threaded from outside of first portion 40, through bore 80, to extend into first bushing 74. Thereafter, second bushing 76 may be inserted into bore 82 and around second end 75 of shaft 64 from outside of first portion 40. Finally, rod 84 of actuator 48 may be inserted into second end 77 of shaft 64, and then actuator 48 may be fastened to the outer surface of first housing portion 40. This assembly process may result in little, if any, chance of a dropped or failed valve component falling into housing 36 and being inhaled by engine 10.

The disclosed diverter valve may have several benefits. For example, the disclosed valve may be able to regulate multiple air flows from many different inlets with a single valve element. This functionality may help to reduce a cost and complexity of the valve. Further, the two-piece design of housing 36 may allow for inexpensive fabrication and simplified failsafe assembly. Finally, the semi-balanced nature of valve element 38 may help to reduce a size of diverter valve 32, and also reduce an amount of torque required by actuator 48 to move the valve element 38 between the different positions when under pressure.

It will be apparent to those skilled in the art that various modifications and variations can be made to the disclosed diverter valve and charge air system without departing from the scope of the disclosure. Other embodiments of the engine systems will be apparent to those skilled in the art from consideration of the specification and practice of the diverter valve and charge air system disclosed herein. It is intended that the specification and examples be considered as exemplary only, with a true scope of the disclosure being indicated by the following claims and their equivalents.

What is claimed is:

1. A charge air diverter valve, comprising:
    a housing, the housing comprising:
        a plurality of first inlets configured to receive a flow of warmed air;
        a plurality of second inlets configured to receive a flow of cooled air;
        a single outlet,
    a single valve element including a plate and a shaft formed within the plate, the single valve element rotatably movable about the shaft to any position between a first position at which the plurality of first inlets are fluidly connected to the single outlet and the plurality of second inlets are blocked from the single outlet, and a second position at which the plurality of second inlets are fluidly connected to the single outlet and the plurality of first inlets are blocked from the single outlet; and
    wherein the plate includes a valve portion configured to selectively block the flows of warmed and cooled air, and a balancing portion,
    wherein the shaft is formed within the plate at a location between the valve portion and the balancing portion.

2. The charge air diverter valve of claim 1, wherein the plurality of first inlets is generally aligned with each other axially, and is configured to receive the flow of warmed air in a direction generally orthogonal to a flow direction of the single outlet.

3. The charge air diverter valve of claim 2, wherein the plurality of second inlets includes two inlets configured to form a generally symmetric Y-shape with a flow direction through the single outlet.

4. The charge air diverter valve of claim 1, wherein the balancing portion is configured to be exposed to both the flows of warmed and cooled air at any position.

5. The charge air diverter valve of claim 4, further including a first lip seal integrally formed at a periphery of the valve portion at only one side of the plate.

6. The charge air diverter valve of claim 5, further including a second lip seal integrally formed at a periphery of the balancing portion at a side of the plate opposite the first lip seal.

7. The charge air diverter valve of claim 1, wherein the valve portion has a pressure area larger than a pressure area of the balancing portion.

8. The charge air diverter valve of claim 1, wherein both sides of the valve portion and both sides of the balancing portion are exposed to the flows of warmed and cooled air during operation.

9. The charge air diverter valve of claim 1, further including:
    a housing configured to receive the plate;
    a first bushing configured to receive a first end of the shaft and being inserted into the housing from inside of the housing; and
    a second bushing configured to receive a second end of the shaft and being inserted into the housing from outside of the housing.

10. The charge air diverter valve of claim 9, further including a fastener having a head configured to engage an outside of the housing and a stem configured pass through the housing and engage the first bushing.

11. The charge air diverter valve of claim 9, further including an actuator configured to engage the outside of the housing and having a rod configured to pass through the housing and into the second end of the shaft.

12. The charge air diverter valve of claim 1, further including:
    a first housing portion forming the plurality of first inlets and the single outlet;
    a second housing portion forming the plurality of second inlets and configured to receive the single valve element, the second housing portion being further configured to engage the first housing portion; and
    a seal disposed between the first and second housing portions.

13. The charge air diverter valve of claim 1, further including an actuator configured to selectively move the single valve element.

14. The charge air diverter valve of claim 13, wherein the actuator is hydraulically powered and electrically controlled.

15. The charge air diverter valve of claim 14, wherein:
upon electric failure, the actuator is configured to move the single valve element to the second position; and
upon hydraulic failure, the actuator is configured to move the single valve element to a position between the first and second positions.

16. A charge air diverter valve, comprising:
a housing have a first portion with a first inlet to receive a first flow of air, and a second portion with a second inlet to receive a second flow of air and an outlet, the second portion configured to engage the first portion;
a valve element disposed within the first portion of the housing and movable between a first position at which the first inlet is fluidly connected to the outlet and the second inlet is blocked from the outlet by the valve element, and a second position at which the second inlet is fluidly connected to the outlet and the first inlet is blocked from the outlet by the valve element;
an actuator mounted to the first portion of the housing; and
a controller configured to actuate the actuator to move the valve element between the first and second positions, the actuator being hydraulically powered and electrically controlled, wherein, upon electric failure, the actuator is configured to move the single valve element to the second position, and, upon hydraulic failure, the actuator is configured to move the single valve element to a position between the first and second positions.

17. The charge air diverter valve of claim 16, wherein the valve element includes:
a plate having a valve portion configured to selectively block the first and second flows, and a balancing portion; and
a shaft formed in the plate at a location between the valve portion and the balancing portion.

18. The charge air diverter valve of claim 17, further including:
a first lip seal integrally formed at a periphery of the valve portion at only one side of the plate; and
a second lip seal integrally formed at a periphery of the balancing portion at a side of the plate opposite the first lip seal.

19. A charge air system for an engine having a plurality of cylinders, comprising:
an intake manifold configured to direct charge air into the plurality of cylinders;
a first compressor associated with a first subset of the plurality of cylinders;
a second compressor associated with a second subset of the plurality of cylinders;
a first aftercooler;
a second aftercooler; and
a diverter valve configured to interconnect the intake manifold, the first compressor, the second compressor, the first aftercooler, and the second aftercooler, the diverter valve having:
a two-piece housing having a first inlet associated with the first compressor, a second inlet associated with the second compressor, a third inlet associated with the first aftercooler, a fourth inlet associated with the second aftercooler, and an outlet associated with the intake manifold;
a single valve element disposed within the two-piece housing and being movable from a first position at which the first and second inlets are fluidly connected to the outlet and the third and fourth inlets are blocked by the single valve element, and a second position at which the third and fourth inlets are fluidly connected to the outlet and the first and second inlets are blocked by the single valve element; and
an actuator mounted to the two-piece housing and configured to selectively move the single valve element between the first and second positions.

* * * * *